United States Patent [19]

France et al.

[11] Patent Number: 4,848,997
[45] Date of Patent: Jul. 18, 1989

[54] METHOD OF PREPARING A HALIDE OPTICAL FIBRE

[75] Inventors: Paul W. France, Newbourne; John R. Williams; Steven F. Carter, both of Ipswich, all of England

[73] Assignee: British Telecommuncations plc, London, England

[21] Appl. No.: 155,055

[22] Filed: Apr. 5, 1988

Related U.S. Application Data

[63] Continuation of Ser. No. 756,304, Jul. 18, 1985, Pat. No. 4,741,752.

[30] Foreign Application Priority Data

Aug. 3, 1984 [GB] United Kingdom ................ 8419829

[51] Int. Cl.$^4$ .............................................. C03B 5/16
[52] U.S. Cl. .................................... 65/3.11; 65/3.13; 65/3.2; 65/134; 65/135; 501/40; 501/35; 501/37; 501/38
[58] Field of Search ................. 65/135, 3.11, 136, 3.2, 65/134, 3.13, DIG. 16; 501/40, 35, 37, 38

[56] References Cited

U.S. PATENT DOCUMENTS

| | | | |
|---|---|---|---|
| 4,659,352 | 4/1987 | Robinson | 65/2 |
| 4,741,752 | 5/1988 | France et al. | 65/134 |

FOREIGN PATENT DOCUMENTS

| | | | |
|---|---|---|---|
| 2033373 | 1/1983 | United Kingdom | 501/40 |
| 2115804 | 9/1983 | United Kingdom | 501/40 |

*Primary Examiner*—Arthur Kellogg
*Attorney, Agent, or Firm*—Nixon & Vanderhye

[57] ABSTRACT

A process for treating a halide, e.g. fluoride, glass composition, characterized by contacting a melt of the composition (3) with dry oxygen (6). Oxygen, simply on contact with a fluoride glass melt, converts transition metals, e.g. from Fe(II) to Fe(III), from one stable state to another and thereby reduces loss at transmission wavelengths in optical fibre, e.g. the loss at 2.6 μm attributabel to Fe(II).

6 Claims, 3 Drawing Sheets

METHOD OF PREPARING A HALIDE OPTICAL FIBRE

This is a continuation of allowed application Ser. No. 756,304 filed July 18, 1985, now U.S. Pat. No. 4,741,752.

FIELD OF THE INVENTION

This invention relates to the treatment of glass compositions. In particular, it relates to the treatment of compositions which are suitable for use in the production of optical fibres, in order that the fibres should have low loss.

BACKGROUND OF THE INVENTION

The distance over which a signal can be successfully transmitted through an optical fibre is limited by two distinct types of loss which occur in glasses generally: losses arising from absorption, e.g. in electronic transitions or vibrational transitions; and losses due to Rayleigh scattering (a phenomenon resulting from inhomogeneities). The latter type of loss is a theoretically inevitable one, although it becomes far less significant at longer wavelengths. If a glass can be formulated so that the absorption is very low at long wavelengths, very low loss (absorption plus Rayleigh scattering) can be achieved in communications at such wavelengths.

In germanosilicate and borosilicate glass fibres, the absorption spectrum is such that they have minimum loss in the range of 0.8–1.2 $\mu$m. Such fibres are less suitable for long than for short distance communication, e.g. between computers. An absorption peak at about 950 nm may be attributed to OH vibrational absorption, and various solutions have been proposed to reduce loss at or around this wavelength, by the passage of gases through the glass melt, such gases being $CO/CO_2$ (GB-A-No.1507712), dry oxygen (GB-A-No. 2033373), chlorides such as $SiCl_4$ (JP-A-No.56-149332) and fluorine-containing gases, e.g. $C_3F_8$ and $F_2$, as drying agents (EP-A-No. 0103441).

Loss may also be attributable to impurities in the glass constituents and therefore in the glass. One class of impurities is the transition metal elements, but the need to reduce the loss caused by such compounds is dependent on the relationship between the wavelength at which they absorb and the transmission wavelength; if these wavelengths are sufficiently different, the impurities can be tolerated.

GB-A-No. 1507712 (see above) discloses that the effect of Fe and Cu impurities in oxide glasses may be reduced, not by removing the compounds as such but by changing the oxidation states of the metals, to Fe(III) and Cu(I), respectively. $As_2O_3$ and other redox buffering agents are proposed for use with the reducing gas CO.

By these various means, it has been sought, in theory or practice, to reduce the absorption losses inherent in optical fibres. A complementary or alternative procedure has been to reduce Rayleigh scattering by formulating glasses which can be operated at longer wavelengths. Silica glasses have loss minima at 1.3 and 1.55 $\mu$m and are already being manufactured and used for long distance communication. More recently, fluoride glasses have been prepared which, it is suggested, might be operated in the 2 to 10 $\mu$m range. It seems more likely that, in the immediate future, the operational range for such fibres will be of the order of 3 $\mu$m. As operational wavelengths increase, there is corresponding difficulty in formulating suitable lasers.

Preferred multi-component fluoride glass compositions are $ZrF_4$-based. Examples of components of such compositions are, in addition to $ZrF_4$ (or $HfF_4$), $BaF_2$, $LaF_3$, $GdF_3$, $AlF_3$ and $NaF$ or $LiF$. Particular compositions, and a general background to the formulation of non-silica-based infra-red fibres, are given by Miyashita et al., IEEE Journal of Quantum Electronics, QE-18, No. 10 (Oct. 1982).

Some multi-component halide glasses are exemplified in Table 1 of the article by Miyashita et al. Suitable compositions can be determined from phase diagrams of the type given for a $ZrF_4$-$BaF_2$-$GdF_3$ composition in FIG. 3 of the article by Miyashita et al.

Robinson et al, Mat. Res. Bull. 15 (1980) 735–742, report the use of $CCl_4$ as a drying agent in fluoride glasses. Halogen and halogen-containing compounds are generally known for use in reactive atmosphere processing.

Tran et al, Sixth Topical Meeting on Optical Fiber Communication (28 Feb.–2 Mar. 1983), New Orleans, Digest of Technical Papers, page 7, disclose reactive atmosphere processing of $ZrF_4$-based glasses using $SF_6$, HF, $CCl_4$, $CF_4$ and $NH_4HF_2$, to effect OH removal.

Bansal et al, J.A. Ceram. Soc. 66(4) (1983) 233, disclose reactive atmosphere processing of $ZrF_4$-based glasses under $Cl_2$, in a study of crystallisation kinetics.

Lecoq et al, Verres et Refractaires 34(3) (1980) 333–342, describe the role of Al as a stabiliser in $ZrF_4$-based glasses. The glass composition was made by melting the constituents under ambient air, "which causes partial hydrolysis of the material at the moment of casting, but without preventing the production of glass if the amount of the sample is sufficient (>5 g)". Air, of course, includes water and dust; both can have undesirable effects, by reaction or physical incorporation, on the properties of, say, optical fibre.

Almeida et al, J. Non-Cryst. Solids 56 (1983) 63–68, disclose that a pronounced effect on the IR absorption edge of bulk $ZrF_4$-based glasses is observed if oxide impurities are present, and that oxygen atoms tend to occupy bridging positions in the $ZrF_4$ chain-like glass skeleton.

Fe(II) and Cr(III), for example, have been observed in fluoride glass compositions. It is reasonable to infer that these are the only oxidation states in which these transition metals can exist, stably, in an fluoride glass matrix.

It is well known that oxygen must be excluded when preparing fluorides. It appears also that oxides and oxygen atoms should not be introduced into fluoride glass compositions. However, there is as yet no satisfactory solution to the problem of reducing absorption losses in such compositions, without going to economically unacceptable lengths to purify the constituent materials.

SUMMARY OF THE INVENTION

According to the present invention, a process for treating a halide glass composition to improve infrared transmission characteristics comprises contacting a melt of the composition with dry oxygen. The use of oxygen is convenient and practical, and avoids problems associated with handling other oxidising agents such as $F_2$, $Cl_2$ and perfluorocarbons. The process can be conducted in simple apparatus of the type illustrated schematically in FIG. 1 of the accompanying drawings, which is described in more detail below.

The present invention is based on the realisation that the raw materials which are used to prepare a halide glass contain carbon ad transition metal impurities which can have a deleterious effect on the absorption spectrum of the glass, and on the attenuation of optical fibre prepared from the glass. It has now been appreciated that, at the likely operational wavelength for fluoride glass fibres, Fe(II) contributes to loss, although Fe(III) does not. This is similar to the problems encountered in oxide glasses, as discussed above, but a difference lies in the fact that losses due to Cu(II) absorption can be substantially ignored at higher wavelengths than are used for transmission in oxide glass fibres. It has also been discovered that fluoride glasses can contain transition metal impurities in different oxidation states, stably within the matrix; this had not been predicted, and was unexpected.

The present invention is based also on the surprising discovery that the use of oxygen does not necessarily cause the production of oxides or other compounds in the glass, which might absorb at or near suitable operating wavelengths. This can now be explained, with hindsight, by the relatively high thermodynamic stability of fluorides with respect to oxides. It has also been found that reactive atmosphere processing is unnecessary for the removal of OH from fluoride glasses.

In the invention, the glass may be any halide, e.g. mixed halide, glass composition. A fluoride glass composition is preferred.

Oxygen will usually be used, in the invention, in admixture with an inert gas diluent. Air can be used, if well dried, e.g. by using molecular sieves or other filters. Thus, for example, an inert gas such as $N_2$ may be used, the gas mixture usually containing at least 1 and generally at least 5, preferably 5 to 50, e.g. 10, % v/v $O_2$.

If appropriate, $O_2$ can be generated in situ. For example, a source of $N_2O$ may be used; $O_2$ and inert gases only are then in contact with the glass melt, under the reaction conditions. As a further example, a suitable liquid which releases $O_2$ on heating can be volatilised and the vapour caused to pass over the glass melt.

It is of course desirable that the oxygen should not be used in the presence of components which can themselves be, or react to introduce, undesirable components in the composition. Moisture must be absent, in order to avoid the formation of oxides. Other components of ambient air, such as dust, should also be avoided. The glass may be melted in a crucible which should be inert.

It is conventional to contact an inert gas with a glass melt, and such a procedure can simply be modified in accordance with the invention. The oxygen may be brought into contact with the glass composition in a conventional schedule of the type used for bubbling gases through borosilicate glasses, e.g. as described in EP-A-No. 0103441, although bubbling is not necessary in this case. Oxygen can simply be flushed over the melt, in a sealed chamber, to give satisfactory results.

DETAILED DESCRIPTION

Figure 1:
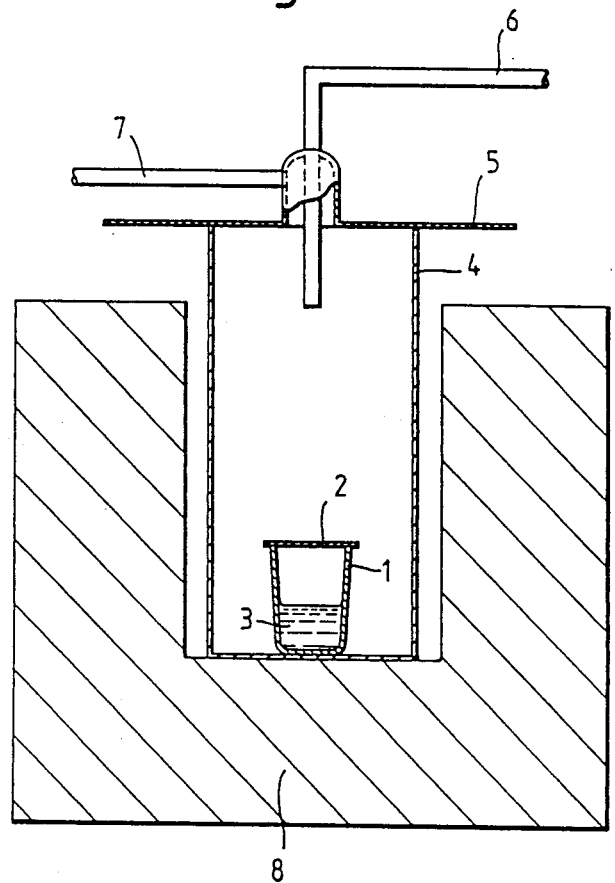
FIG. 1 shows apparatus upon which the inventors' process can be practiced.

FIG. 1 shows a suitable sealed chamber. Within the chamber, there is a crucible 1 having a lid 2 and containing a glass melt 3. The crucible 1 is housed within a liner 4 having a lid 5 through which gas can enter via an inlet 6 and exit via an outlet 7. The crucible 1 and the liner 4 are positioned inside a furnace 8. The crucible may be of Pt/Au, the liner and its lid of silica.

The schedule of oxygen/melt contact will in fact usually comprise a period during which an inert gas/oxygen gas mixture is contacted with the melt, followed by an inert gas phase which allows cooling. The period of oxidation may be from 30 min to 5 hours. The temperature during oxidation may be from 600° to 1200° C.

The desired effect of the process of the invention can be monitored by observation of the absorption characteristics of the bulk glass and, in particular, by monitoring the disappearance of Fe(II) absorbence in the 2-3 $\mu$m wavelength range, or the appearance of absorbence owing to Fe(III). The reaction should go substantially to completion, i.e. so that there is substantially no Fe(II) absorbence, a characteristic which can be determined by relative experimentation at least.

Compositions treated by the invention can be formulated into bulk glasses or preforms for subsequent drawing into optical fibres, e.g. for monomode transmission. It is preferred that both core and cladding glasses of an optical fibre are treated by the process of the invention. Fast quenching may be necessary. Chemical vapour deposition may be used.

Glass compositions treated by the invention can also be used for optical components in general, e.g. windows and test apparatus, and wherever there is a need for long wavelength transmission.

Fluoride (and other halide) glass fibres can be produced by the methods described by Miyashita et al., supra. These methods can be used or suitably modified for the production of fibres having a core and a cladding, e.g. from a double-crucible or by casting; see also Mitachi et al., Electron Lett. 18 (February 1982) 170-171. The core diameter may be 5 to 200 $\mu$m, and the cladding's outer diameter is usually at least 25 $\mu$m more, e.g. 100 to 300 $\mu$m. Optical fibres of the invention may have low loss, e.g. less than 100 dB/km (at 2.8 $\mu$m).

The following Examples illustrate the invention.

EXAMPLE 1

Two glass compositions (about 20 g and 30 g, respectively) were prepared from $ZrF_4$, $BaF_2$, $LaF_3$, $AlF_3$, NaF, $PbF_2$ (in the first case) and $NH_4HF_2$. The amounts of these components in the first (core glass) composition were 11.71, 4.65, 1.41, 0.37, 1.03, 0.83 and 0.5 g, respectively; in the second (cladding glass) composition, these amounts were 18.66, 7.39, 1.68, 0.53, 1.76, 0 and 0.5 g, respectively.

The compositions were heated to 400° C. in separate, inert crucibles with lids, under a nitrogen gas flow at a rate of 3 l/min. After 45 minutes, the temperature of the oven was raised to 900° C. After 60 minutes, oxygen was also introduced, at a rate of 0.2 l/min, and the combined nitrogen/oxygen flow was maintained for 2 hours. The oxygen flow was then turned off and the temperature was reduced to 670° C. After a further hour, the melts were cast to form a preform, by centrifugally casting the cladding glass into a tube and then casting the core glass into that tube, followed by cooling and annealing.

The preform was drawn into fibre having an external diameter of 180 $\mu$m. The loss characteristics of the fibre were observed. An attenuation maximum corresponding to about 1 ppm Cu(II) was observed at about 1 μm, and an attenuation minimum, apparently substantially free of loss owing to Fe(II), at 2.6–2.7 μm.

EXAMPLE 2

The procedure of Example 1 was followed, except that a temperature of 850, rather than 900° C. was used and the $O_2$ flow rate was increased to 0.3 l/min. The product was again satisfactory, with little or no loss attributable to Fe(II).

EXAMPLE 3

A series of tests was conducted to illustrate the utility of the invention. A glass composition was made up from anhydrous fluoride powders which had been stored under dry nitrogen. The composition was 51.5% $ZrF_4$, 19.5% $BaF_2$, 5.3% $LaF_3$, 3.2% $AlF_3$, 18.0% NaF and 2.5% $PbF_2$ (percentages by weight). The powders were weighed and mixed into plastic containers in batches of 30 g. In general, 0.1 wt % metal fluoride was added to each batch, using the materials shown in the Table, below. In addition, 0.5 g $NH_4HF_2$ was also added, to convert any residual oxides into fluorides.

In testing, a batch was transferred to a Pt/Au crucible fitted with a lid and housed within a sealed silica liner, as shown in the accompanying drawing. Dry nitrogen was flushed through the liner. A typical melt schedule is shown below:

| TIME INTO RUN (h) | TEMPERATURE (C.) | GAS |
|---|---|---|
| 0 | 400 | $N_2$ (3 l/min) |
| 0.75 | 850 | |
| 1 | 850 | $O_2$ (0.3 l/min) |
| 3 | 670 | |
| 4 | Quench | $N_2$ |

All glasses were melted under both oxidising and reducing conditions. Oxidising conditions were provided by introducing 0.3 l/min of $O_2$ into the $N_2$ gas flow, 1 hr into the run, and maintaining this until the end. The $pO_2$ in this case was 0.091 atmospheres. Reducing conditions were obtained by melting in a Pt/Au crucible under dry nitrogen supplied from a large reservoir of liquid nitrogen ($-196°$ C.). Since the melting temperature was kept constant and the $N_2$ supply was from a continuous source with a quoted oxygen content of less than 10 ppm, the oxygen fugacity is believed to have been fairly constant between runs.

After 4 hr (total melting time), the liner was removed from the furnace so that the melt could be quenched whilst still under an atmosphere of dry nitrogen. After a quench time of 5 min, the glass had reached Tg, and the crucible and glass sample were transferred to an annealing oven at 240° C. The sample was cooled overnight to room temperature, before being removed from the crucible and cut and polished in preparation for optical measurements, to thicknesses in the range of 6 to 24 mm.

Absorption spectra were measured over a wavelength range of 0.2 to 2.85 μm. In general, the colours observed in the absorption spectra were similar to those seen in low alkali oxide glasses where the transition metals take up octahedral symmetry, apart from Fe and Cu where the weaker ligand field associated with fluoride has removed the normal colouration and shifted the absorption into the infra-red.

In order to confirm that the appropriate dopants had been dissolved into the melt, dopant concentrations were independently measured on each sample using electron microprobe techniques. The work was done with a Cambridge Instruments S180 scanning electron microscope fitted with a Microspec wavelength dispersive X-ray spectrometer. Small circular blocks, about 6 mm in diameter, were cut from each glass sample and mounted in a large block. The top surface was then polished flat, coated with gold and mounted for electron microprobe work.

The results from the microprobe work are given in the Table, and compared with the expected dopant concentrations. The large error of ±20% on these measurements arises from the lack of suitable standards. Nevertheless, within experimental error, the respective values agree well. The Table shows that, in several cases, the detected concentrations were considerably lower than those expected and, in particular, Ti and V were low in the oxidised samples; Ti, Co, Ni and Cu were low for the reduced cases.

Since $TiF_4$ and $VF_5$ are very much more volatile than the other glass components, it is likely that these evaporated out of the melt. Under reducing conditions, it is likely that Ni and Cu partially precipitated out of the melt as the reduced metal ($Cu^0$ etc.). In fact, for the case of Cu in particular, , it could be seen that Cu metal was left on the walls of the Pt/Au crucible after melting. In all cases, some traces of dopant were still dissolved in the glass.

TABLE
(MICROPROBE RESULTS)

| | | Detected Level (±20%) | |
|---|---|---|---|
| Dopant | Dopant Level | Oxidised | Reduced |
| $TiF_4$ | 390 | 20 | — |
| | 1000 | — | 150 |
| $VF_4$ | 400 | — | 300 |
| | 1000 | 60 | — |
| $CrF_3$ | 480 | 400 | — |
| | 1000 | — | 1100 |
| $MnF_2$ | 590 | — | 450 |
| | 1000 | 800 | — |
| $FeF_2$ | 600 | 500 | 550 |
| $FeF_3$ | 500 | — | 500 |
| $CoF_2$ | 600 | 550 | 350 |
| $NiF_2$ | 600 | 400 | 100 |
| $CuF_2$ | 620 | 500 | 100 |

EXAMPLE 4

Bulk glasses were made up from anhydrous fluorides and doped with Fe and Cu. The host glass was a Zr-Ba-La-Al-Na-Pb fluoride composition which was used as the core glass in IR fibres. Oxidised and reduced glasses were made up by melting under a stream of $N_2$, either alone (reducing) or together with $O_2$.

Figure 2:
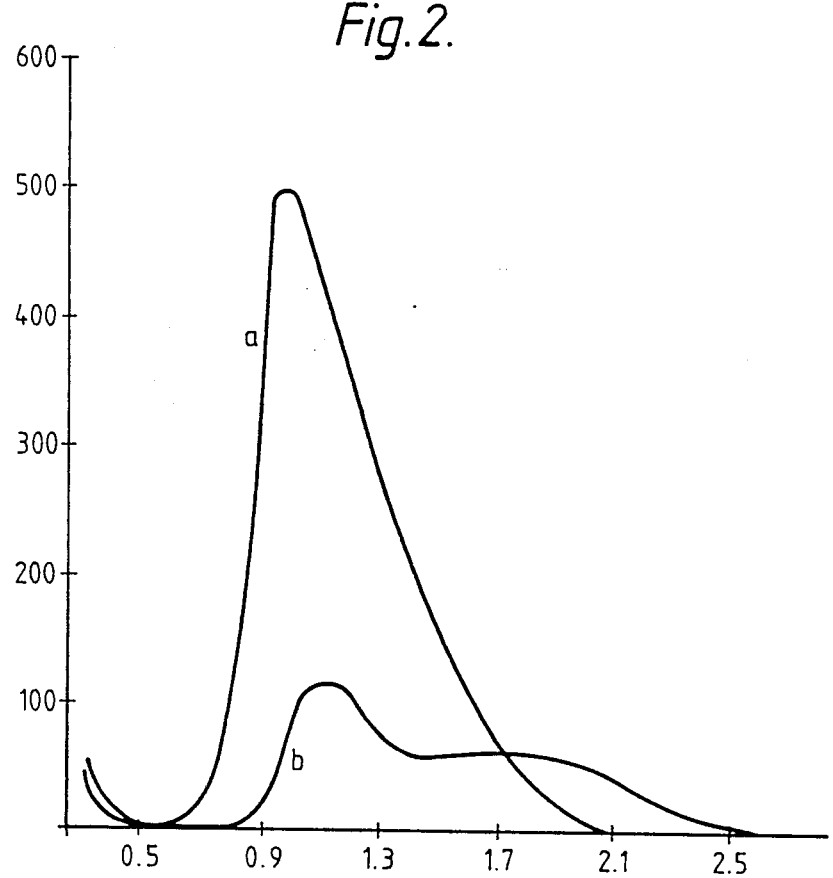
FIGS. 2 and 3 show absorption spectra for the glasses discussed in Examples 4 and 5, respectively.

The absorption spectra for these glasses are shown in FIG. 2 as a function of the extinction coefficient (abscissa) in dB/km/ppm with respect to wavelength (ordinate) in μm. Under reducing conditions, a large peak is apparent, centred at 1.12 μm with a side shoulder at 1.75 μm. This has been attributed to $Fe^{2+}$ in distorted octahedral symmetry; see Ohishi et al, Phys. & Chem. Glasses 24 (1983) 135–40. Under oxidising conditions, Fe absorption is removed as $Fe^{2+}$ is oxidised to $Fe^{3+}$. An alternative peak is developed, centred at 0.97 μm. This can be attributed to $Cu^{2+}$ in tetragonal symmetry. Although there are two conflicting effects, it should be noted that the absorption due to $Cu^{2+}$ tails off more rapidly beyond 1.5 μm than that due to $Fe^{2+}$. Since Fe usually occurs at a higher level of impurity than Cu, it can be concluded that, in order to minimise overall absorption losses, oxidising atmospheres should be used.

EXAMPLE 5

Infra-red fibres were fabricated from both oxidised and reduced glasses in order to determine the effects on the transmission losses. The core glass was of the same composition as that described in Example 4, and the cladding glass was similar but with a lower refractive index. Reducing conditions were again obtained from a flow of dry $N_2$; $O_2$ was introduced to give oxidising conditions. The glasses were converted into preforms using rotational casting as described by Tran et al, Electron. Let. 18 (1982) 657–658, and were drawn into fibre using conventional techniques. The fibres were 170 μm in diameter with a core of 90 μm and loss measurements were made on 60 μm of fibre cut from a 300 m length.

Figure 3:
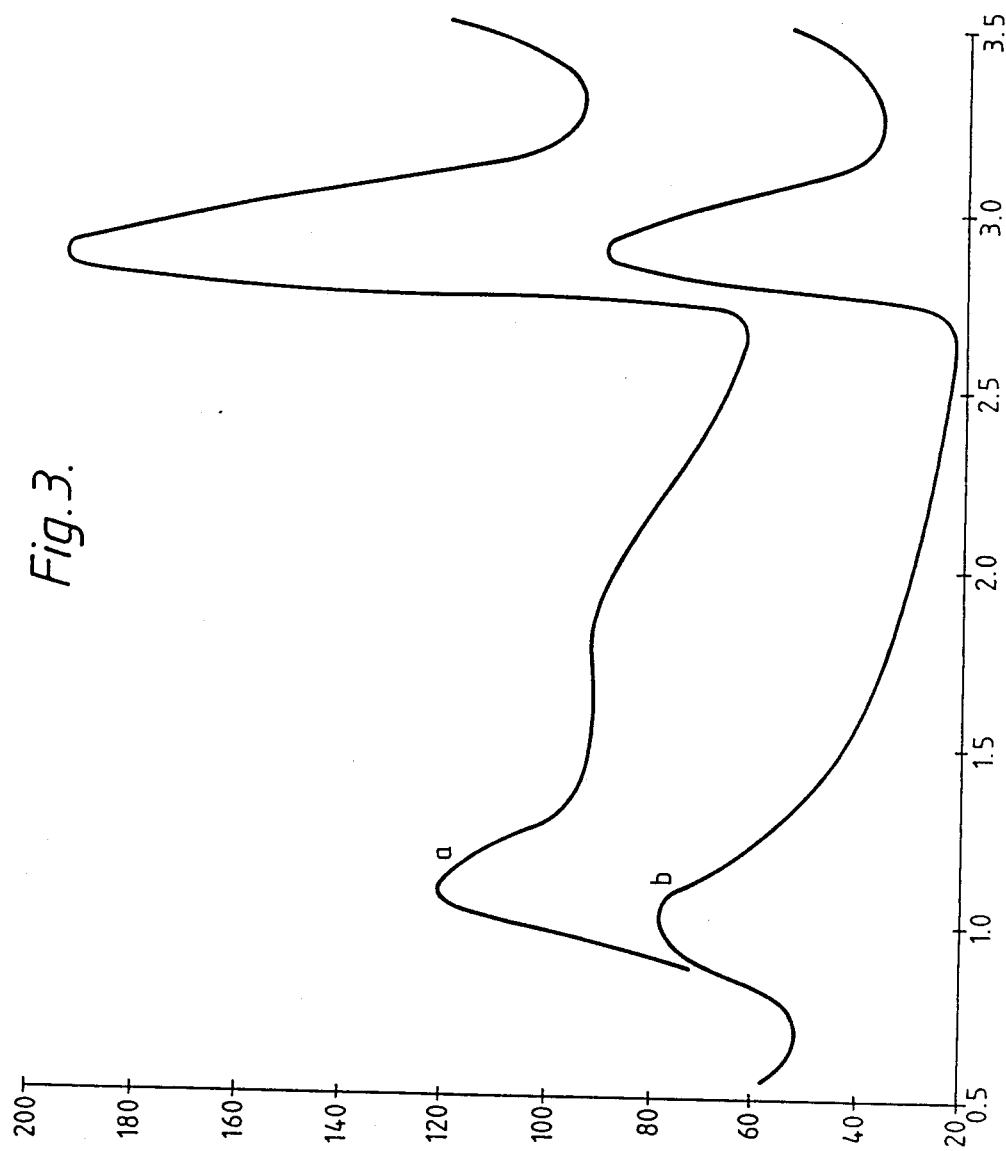

FIG. 3 shows absorption curves a and b, for fibres made respectively under reducing and oxidising conditions, as a function of the extinction coefficient (abscissa) in dB/km with respect to wavelength (ordinate) in μm. The fibres have similar characteristics, with a minimum loss occurring close to 2.7 μm, an OH absorption at 2.87 μm and an IR edge rising above 3.3 μm. The reduced fibre, however, clearly exhibits an $Fe^{2+}$ absorption corresponding to about 600 ppb of Fe (assuming all Fe exists as $Fe^{2+}$. The oxidised fibre has little $Fe^{2+}$ absorption, but now exhibits a peak centred at 0.97 μm corresponding to about 100 ppb of $Cu^{2+}$. By removing the $Fe^{2+}$ absorption and reducing scattering losses, the total loss in this fibre has been reduced to 21 dB/km at 2 7 μm.

More detailed studies of the loss of fibre (b) at shorter wavelengths allow estimates to be made of the impurity levels of several transition metals and rare earths.

Fe is found to be the dominant impurity (Fe<600 ppb, Cu<100 ppb, all others <80 ppb) and, for this reason, it is likely that oxidised glasses will give lower absorption losses. The absorption loss of fibre (b) has been estimated to be of the order of 2 dB/km at 2.5 μm and this figure has been corroborated by measurements at shorter wavelengths using calorimetric absorption; see White et al, Opto-Electron. 5 (1973) 323–324.

What is claimed is:

1. A method of preparing a halide optical fibre which method comprises:
    (a) separately preparing a halide cladding glass composition and a halide core glass composition, wherein the preparations include contacting melts of said compositions with dry oxygen;
    (b) casting said cladding glass composition and said core glass composition to form a fibre preform; and
    (c) drawing said preform to an optical fibre having an attenuation of less than about 100 dB/km at wavelengths of the order 2.7 microns.

2. A method according to claim 1 wherein step (b) comprises casting the cladding glass as a tube and then casting the core glass into the tube.

3. A method of preparing a fluoride optical fibre which method comprises:
    (a) separately preparing a fluoride cladding glass composition and a fluoride core glass composition, wherein the preparations include contacting melts of said compositions with dry oxygen;
    (b) casting said cladding glass composition and said core glass composition to form a fibre preform; and
    (c) drawing said preform to an optical fibre having an attenuation of less than about 100 dB/km at wavelengths of the order 2.7 microns.

4. A method according to claim 3 wherein step (a) comprises melting each composition in contact with a dry inert gas and then contacting each melt with dry oxygen or a dry mixture of oxygen and an inert gas whereby the impurities therein are oxidized.

5. A method of preparing a fluoride optical fibre which method comprises:
    (a) separately preparing a fluoride cladding glass composition and a fluoride core glass composition, wherein said preparations include contacting melts of said compositions with a dry mixture of inert gas and oxygen;
    (b) casting said cladding glass composition and said core glass composition to form a fibre preform; and
    (c) drawing said preform to an optical fibre having an attenuation of less than about 100 dB/km at wavelengths of the order of 2.7 microns.

6. A method of preparing a fluoride optical fibre which method comprises:
    (a) separately preparing a fluoride cladding glass compositions and a fluoride core glass composition wherein each of said preparations includes contacting a melt with a dry mixture of oxygen and inert gas;
    (b) casting said cladding glass composition as a tube and thereafter casting said core glass composition into the bore of said tube whereby a fibre preform is produced; and
    (c) drawing said preform to an optical fibre having an attenuation of less than about 100 dB/km at wavelengths of the order of 2.7 microns.

* * * * *